(12) United States Patent
Kim

(10) Patent No.: US 7,113,810 B2
(45) Date of Patent: Sep. 26, 2006

(54) ADAPTIVE METHOD FOR REDUCING POWER CONSUMPTION IN A STANDBY MODE OF A DIGITAL RADIO COMMUNICATION SYSTEM

(75) Inventor: Gi-Beom Kim, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 675 days.

(21) Appl. No.: 09/993,184

(22) Filed: Nov. 14, 2001

(65) Prior Publication Data

US 2002/0086720 A1 Jul. 4, 2002

(30) Foreign Application Priority Data

Dec. 30, 2000 (KR) ................................ 2000-87188

(51) Int. Cl.
*H04B 1/38* (2006.01)
(52) U.S. Cl. ..................... 455/574; 455/343.1

(58) Field of Classification Search ................ 455/574, 455/343.2, 343.4, 550; 370/311, 335, 503
See application file for complete search history.

(56) References Cited

U.S. PATENT DOCUMENTS

| 6,016,312 | A  * | 1/2000  | Storm et al. ............... 370/311 |
| 6,029,061 | A  * | 2/2000  | Kohlschmidt ............... 455/574 |
| 6,333,939 | B1 * | 12/2001 | Butler et al. ............... 370/503 |
| 6,453,181 | B1 * | 9/2002  | Challa et al. ............... 455/574 |
| 6,725,067 | B1 * | 4/2004  | Marx et al. ................. 455/574 |
| 6,735,454 | B1 * | 5/2004  | Yu et al. ..................... 455/574 |

* cited by examiner

*Primary Examiner*—Temica Beamer
*Assistant Examiner*—Joy Contee
(74) *Attorney, Agent, or Firm*—Dilworth & Barrese, LLP

(57) ABSTRACT

Disclosed is an adaptive method for reducing power consumption in a standby mode of a digital radio communication terminal. The method comprises the following steps of: calculating the difference of edge timings between a main clock and a low clock; comparing the calculated timing difference with a predetermined difference reference value; and upgrading or downgrading a catnap period according to a result of the step of comparing.

1 Claim, 3 Drawing Sheets

ADAPTIVE METHOD FOR REDUCING POWER CONSUMPTION IN A STANDBY MODE OF A DIGITAL RADIO COMMUNICATION SYSTEM

PRIORITY

This application claims priority to an application entitled "THE ADAPTIVE POWER SAVING METHOD FOR DIGITAL WIRELESS COMMUNICATION SYSTEM DURING STANDBY MODE" filed with the Korean Industrial Property Office on Dec. 30, 2000 and assigned Ser. No. 2000-87188, the contents of which are hereby incorporated by reference.

BACKGROUND OF THE INVENTION

1. Field of the Invention

The invention relates generally to a method for reducing power consumption in a mobile radio terminal such as a radio telephone, and more particularly, to a method for reducing power consumption in a standby mode of a radio terminal when the radio terminal is operated in a slotted paging mode in a CDMA (Code Division Multiple Access) radio telephone system.

2. Description of the Related Art

The slotted paging mode is a form of DRX (Discontinuous Reception) operations for a mobile radio terminal actuated by a battery such as a cellular radio telephone. The mobile radio terminal is adapted to radio communication with at least one remote base station in the radio telephone system. In the slotted paging mode, when the radio terminal (also referred to as a mobile station) is in an idle mode (or is not in conversation), the radio telephone is generally in a low power state without continuously monitoring a paging channel.

The slotted paging mode is important in the battery life of the radio telephone. It is an object of operating the slotted mode to reduce the operating time of a radio apparatus into the smallest amount and interrupt the power of the radio apparatus as little as possible during a sleep period. In an idle mode, the radio telephone wakes up only in a previously allocated slot by the radio telephone system or for treating certain other conditions such as a user input.

In returning from the sleep period, the radio apparatus should re-acquire an RF (Radio Frequency) link with the base station of the radio telephone system. Acquisition of the link and other operations including communication protocols for such a system are defined in air interface standards. An example of such a standard may include the TIA/EIA (Telecommunications Industry Association/Electronic Industry Association) IS-95: "Mobile Station-Base Station Compatibility Standard for Dual-Mode Wideband Spread Spectrum Cellular System." The IS-95 defines a DS (Direct Sequence)-CDMA or CDMA radio telephone system.

In order to re-acquire the RF link, the radio telephone of the CDMA system synchronizes with the system time that is maintained by the base station and a network controller of the CDMA system. The timing for a forward link (base station to mobile station) should be maintained by the radio telephone in anticipation that the radio apparatus is promptly started when an allocated slot is generated. The timing uncertainties are modified and the paging channel is acquired to prepare for treatment.

The synchronization with the forward link includes an alignment of a PN (Pseudorandom Noise) sequence transmitted to a pilot channel by the base station and a locally generated PN sequence. The transmitted sequences include a "short PN" sequence, which is repeated every 26⅔ ms, and a "long PN" sequence, which is repeated every 41 days. The radio telephone includes a sequence generator for generating short and long PN sequences same as those used by the base station. The radio telephone uses a searcher receiver or other mechanism for aligning the short PN sequence with that received from the base station. Once the pilot channel is acquired, the radio telephone acquires a synchronizing channel and the paging channel. Then, the radio telephone correctly demodulates a traffic channel to establish a full-duplex link with the base station.

In the start after the sleep time, the radio telephone synchronizes with the long PN sequence and the short PN sequence. The PN sequences and a frame boundary are repeated with a logical frequency in the IS-95 system. The frame boundary is generated in every third PN roll boundary. The PN roll boundary is defined by a short PN sequence which reverse rolls to the initial value thereof. In the mobile station, the short PN sequence and the long PN sequence are defined as a linear sequence. The short PN sequence and the long PN sequence are generated by using a LSG (Linear Sequence Generator). The LSG is described as a polynomial, and obtained by using a shift register and an exclusive OR gate. Since the short PN sequence is repeated only in every 26⅔ ms, the LSG, when withdrawing from the sleep state, can be conveniently stopped in a specific phase of the sequence until the phase has a correlation with a system PN. Then, the short PN LSG synchronizes with the system timing and starts again.

However, the long PN sequence is repeated only once in every 41 days. It is unpractical that the long PN generator of the radio telephone is stopped (for example, when entering the sleep state) and then the generator is clocked at high speed to catch up the long PN of the system in the start thereafter.

Since the short PN sequence and the long PN sequence are transmitted by the system which varies predictably according to time, the PN sequence acquisition requires that a correct reference time is maintained in the mobile station during the sleep mode. A PN sequence can be suitably determined for the correlation with the system PN sequence in withdrawing from the sleep mode. However, maintaining a precise timing reference requires a relatively high power consumption which is contradictory to the sleep mode designed for low power consumption.

In addition to withdrawing from the sleep mode during the allocated slot, the radio telephone is also required to start for handling other asynchronously generated events in the radio apparatus or for responding to the same. An example of this type of event can include a user input such as pressing a keypad of the radio telephone. The response to such an input should be prompt without any delay which can be recognized by the user.

As it is important in the foregoing related art, a technique for reducing power consumption uses a method in which a receiver in a standby mode is activated only at a pre-designated time to perform a receiving operation during a certain time and then returns to the low power mode by using the slotted paging mode supported by the system. Here, even in the low power mode, minimum clocking is required for the purpose of maintaining synchronization with the system being re-activated and responding to the external input such as an interrupt.

However, while an edge timing should be suitably used in order to use the low frequency clock, actually a mode operated in a high frequency clock is present between receiving modes to maintain the correct edge timing required by the system. Such a mode is referred to as catnap mode in the following description. The operation of this catnap mode is defined with a certain period, and this period is defined via a trade-off according to an experiment.

However, if the operating period of the catnap mode is shorter than required, a loss is caused in power consumption, and if too long, the system may not be suitably synchronized in some cases.

SUMMARY OF THE INVENTION

As described hereinbefore, since the catnap mode, which is used for low speed clock compensation to reduce power consumption, is fixed with a certain value, unnecessarily high power consumption may take place or on the contrary abnormal synchronization to the system may take place.

It is therefore an object of the present invention to provide an adaptive method of updating a catnap period so that a stable synchronization to the system can take place without an unnecessary power consumption.

According to an embodiment of the invention to obtain the foregoing object, an adaptive method for reducing power consumption in a standby mode of a digital radio communication terminal is provided. The method comprises the steps: calculating the difference of edge timings between a main clock and a low clock; comparing the calculated timing difference with a predetermined difference reference value; and upgrading or downgrading a catnap period according to the result of the step of comparing.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is applicable to a digital radio system supporting a slotted paging mode. First, an example of the radio terminal system and the radio terminal will be described in detail in reference to FIG. 1. The system is exemplified as disclosed in U.S. Pat. No. 6,016,312 assigned to Motorola as shown in FIG. 1.

Figure 1:
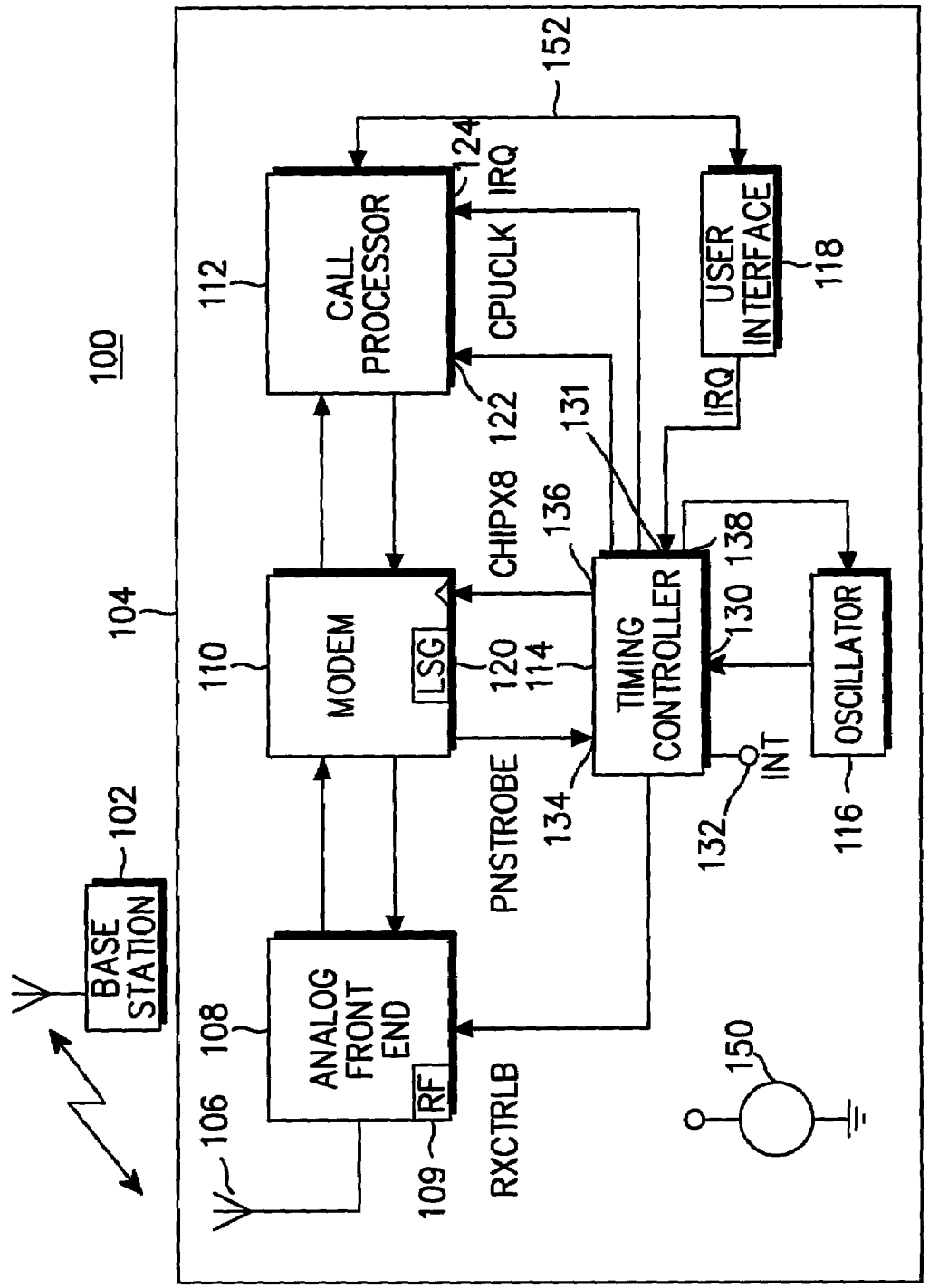
FIG. 1 is a drawing illustrating the block construction of a radio terminal in a radio telephone system according to the invention.

Referring to FIG. 1, the radio telephone system 100 includes a number of base stations which are constructed for radio communication with at least one mobile station including a CDMA radio telephone such as a radio telephone 104. The radio telephone 104 is adapted to receive/transmit a DS-CDMA signal for communication with a number of base stations, including the base station 102. In the disclosed embodiment, the radio telephone system 100 is a CDMA radio telephone system that is operated at 800 MHz according to a temporary standard IS-95 of TIA/EIA: "Mobile Station-Base Station Compatibility Standard for Dual-Mode Wideband Spread Spectrum Cellular System." In general, the radio system 100 operates according to another CDMA system or any suitable radio telephone system including a PCS system which is operated at 1800 MHz.

The base station 102 transmits a spread spectrum signal to the radio telephone 104. A symbol of a traffic channel is spread by using a Walsh code in a process that is known as Walsh covering. The mobile station such as the radio telephone 104 is allocated with a characteristic Walsh code by the base station 102 so that a traffic channel transmission to each mobile station perpendicularly intersects every traffic channel transmission to a different mobile station. The symbol is spread by using a short PN sequence or code repeated every 26⅔ ms or a long PN sequence or code repeated every 41 days. A communication via an RF (Radio Frequency) link between the base station and the radio telephone 104 has the shape of a chip having a velocity of 1.2288 Mega-chips per second. The chip is a data bit.

The radio telephone 104 includes an antenna 106, an analog front end 108, a modem 110, a call processor 112, a timing controller 114, an oscillator 116, a user interface 118 and a battery 150. The battery 150 supplies operating power to other components of the radio telephone 104.

The antenna 106 receives an RF signal from the base station 102 and other neighboring base stations. The received RF signal is converted into an electric signal by the antenna 106, and then sent to the analog front end 108. The analog front end 108 includes an RF section 109 including circuit devices such as a receiver and a transmitter which can be powered off in the slotted paging mode. The analog front end 108 filters the signal to provide a conversion to a base band signal.

The analog base band signal is sent to the modem 110 where the base band signal is converted into a digital data stream for the following process. The modem 110 generally includes a rake receiver and a search receiver. The search receiver searches for a pilot signal which is received by the radio telephone 104 from a number of base stations including the base station 102. The search receiver despreads the pilot signal by using a correlator together with a system PN code generated in the radio telephone 104 by using a local reference timing. The search receiver includes at least one sequence generator such as an LSG 120 to generate the PN code. The modem 110 correlates the locally generated PN code with the received CDMA signal. The modem 110 detects a system timing indicator transmitted by the radio telephone system 100. In particular, the modem 110 detects a PN roll over boundary and sends an indication of the PN roll over boundary to the timing controller 114. The modem also includes a circuit device for transmitting data from the radio telephone 104 to a base station such as the base station 102. The modem 110 can be constructed of conventional elements.

The call processor 112 controls functions of the radio telephone 104. The call processor 112 is operated in response to a stored command program, and includes a memory for storing commands and other data. The call processor 112 includes a clock input 122 for receiving a clock signal and an interrupt input 124 associated with the timing controller 114 for receiving an interrupt request signal. The call processor 112 receives an interval from the base station 102, in which the radio telephone should search for a page. The radio telephone can monitor the paging channel for 160 ms during this interval, but cannot be in a sleep state. The call processor 112 adjusts an event in the radio telephone required for entry and exit into/from the sleep mode. Such an event includes steps of continuously tracing a system time, proceeding to the LSG state, restarting the oscillator 116, enabling power to the RF section 109 of the analog front end 108 and restarting the clock from the timing controller 114 to the modem 110. The call processor 112 is associated with other elements of the radio telephone.

The user interface 118 allows the user to control the operation of the radio telephone 104. The user interface 118 typically includes a display, a keypad, a microphone and a receiver. The user interface 118 is associated with the call processor 112 by a bus 152.

The timing controller 114 controls the timing of the radio telephone 104. In particular, the timing controller 114 controls an entry/exit into/from the slotted paging mode by the radio telephone 104 and a synchronization of the local timing of the radio telephone 104 with the system timing of the radio telephone system 100. The timing controller 114 has a clock input 130 for receiving a clock signal from the oscillator 116, an interrupt input 131 for receiving an interrupt request from the user interface 118 and an interrupt input 132 for receiving an interrupt request from other components of the radio telephone 104.

The timing controller 114 has a timing input 134 for receiving the timing signal from the modem 110 and a timing output 136 for sending the timing signal to the modem 110. The timing signal (designated as "PNSTROBE" in FIG. 1) received from the modem 110 corresponds to a PN roll boundary of the short PN sequence of the radio telephone synchronized to the base station. The PN roll boundary is defined in a return of the PN sequence as the initial value. "PNSTROBE" is a series of pulses every 26⅔ ms, which are synchronized to the PN roll boundary. The timing signal (designated as "CHIPX8" in FIG. 1) sent to the modem 110 is a clock signal of a velocity of 8×1.2288 Mega-chips per second. Other suitable velocities can also be used. When the timing signal is cleared from the modem 110, the modem 110 enters the low power mode and the entire internal state is frozen.

The oscillator 116 is a reference oscillator for generating a reference clock signal at a first velocity. In the disclosed embodiment, the oscillator 116 generates a precise clock signal having accurate resolution such as a clock signal of 16.8 MHz. The timing controller 114 has a control output 138 for sending a control signal to the oscillator 116. In response to the control signal, the oscillator 116 is activated and inactivated. When inactivated, the oscillator 116 enters the low power mode. The timing controller 114 further sends the control signal (designated as "RXCTRLB" in FIG. 1) to the analog front end 108. In response to the control signal, the analog front end 108 is selectively powered off.

In such a method for reducing power consumption of the radio telephone 104 of the radio telephone system, a certain period has been given to the catnap mode so far which operates in the high frequency clock, even in the receiving mode, to maintain a correct edge timing as required by the system to suitably use the edge timing with the low frequency clock.

Figure 2:
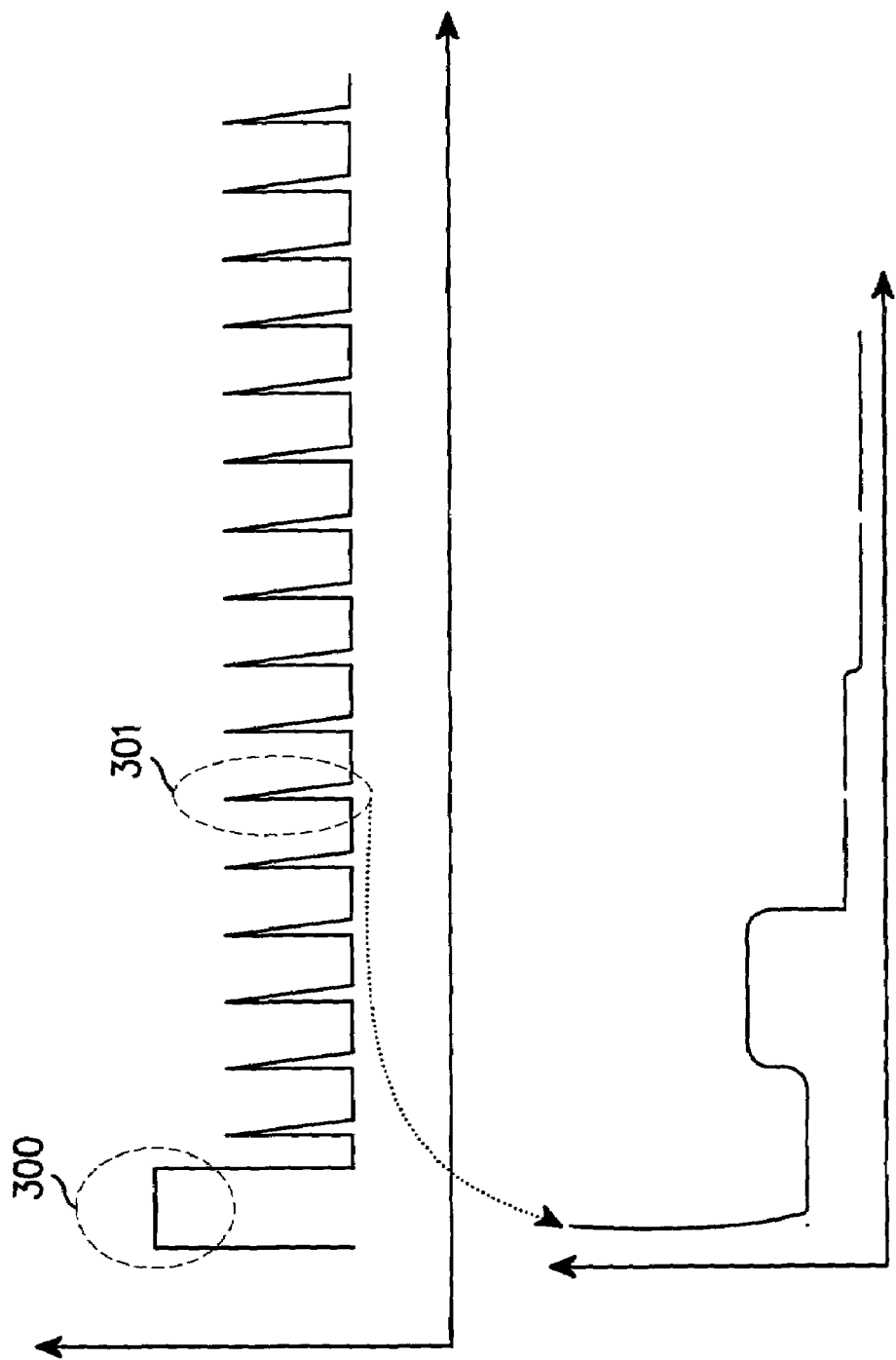
FIG. 2 is a diagram illustrating a general current waveform of a slotted paging mode and a catnap mode.

Referring to FIG. 2, the operation of the catnap mode 301 has been defined with a certain period so far, which is determined through a trade-off by an experiment. It can be seen that power is consecutively consumed in a conversation mode 300 as shown in FIG. 2.

The present invention adaptively adjusts the operating period of the catnap mode to prevent that the operating period of the catnap mode from having a power consumption loss if in practice, the operating period of the catnap mode is shorter than necessary or the operating period of the catnap mode is not suitably synchronized to the system if too long.

Figure 3:
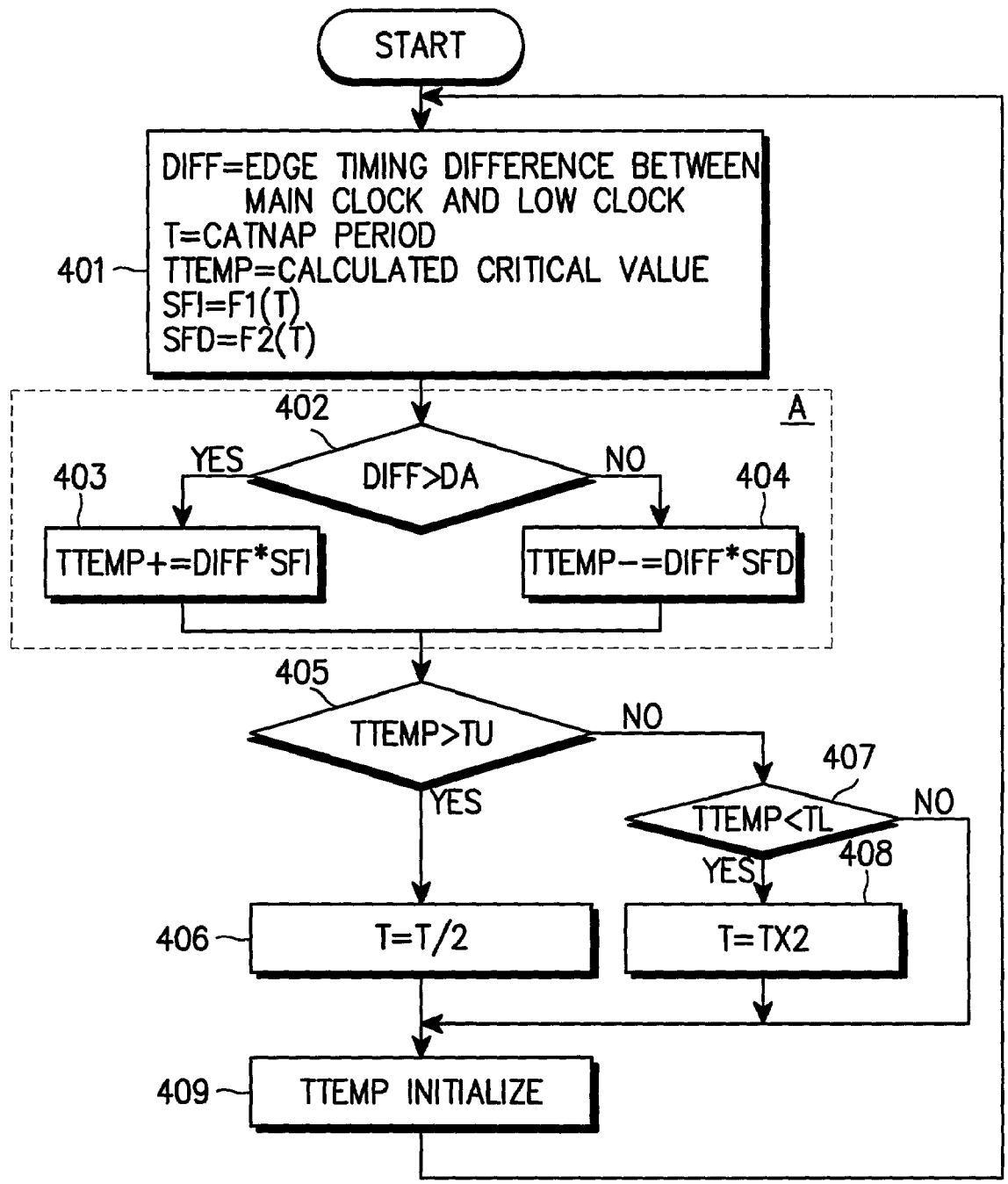
FIG. 3 is a flow chart illustrating a process for calculating an adaptive catnap mode operation period according to an embodiment of the invention.

FIG. 3 is a flow chart illustrating a process for calculating an adaptive catnap mode operation period according to an embodiment of the invention. Such an operation can be performed by the timing controller 114 of the radio telephone 104. Referring to FIG. 3, variables necessary for calculation are determined and a reference calculation is performed. In the operation, the difference between edge timings of a main clock and a low frequency clock are counted and then stored in a variable "DIFF." Also, a period T of the catnap is determined for the application during the present slot cycle. Such a period T can be suitably predetermined in the initial stage. Then, a variable "TTEMP" is determined for the catnap period calculation of the next step. SFI (Scaling Factor for Increment) and SFD (Scaling Factor for Decrement) are scaling vectors used in adaptively upgrading or downgrading the "TTEMP", and both are determined by the period of the catnap.

In step 402, it is determined if the edge timing difference "DIFF" of the main clock and the low frequency clock calculated above is over a predetermined difference reference value "DA (Difference Allowed)." Being over the difference reference value "DA", the process proceeds to upgrade the catnap period calculation variable "TTEMP" by using the difference value "DIFF" and "SFI" in step 403, which is followed by proceeding to step 405. Conversely, if the edge timing difference "DIFF" is less then or equal to the predetermined difference reference value "DA" in step 402, the process proceeds to downgrade the "TTEMP" by using "DIFF" and "SFD" in step 404, which is also followed by proceeding to step 405. Steps 402 to 404 are repeatedly calculated in the catnap generated in the low power mode during one slot cycle.

In step 405, a calculated result is compared to a predetermined value as the maximum critical value "TU." If the calculated result is greater than the maximum critical value "TU", the process proceeds to step 406 to shorten the catnap period "T" to prevent any unsuitable synchronization to the system. Conversely, if the calculated result is less than or equal to the maximum critical value "TU", the process proceeds to step 407. In step 407, the calculated result is compared with a predetermined value as the minimum critical value "TL." If the calculated result is less than the minimum critical value "TL", the process proceeds to step 408 to lengthen the catnap period "T" to reduce an unnecessarily consumed current. In step 409, the "TTEMP" is initialized. The process is then repeated by returning to step 401.

In the foregoing construction according to the digital radio communication terminal system of the present invention, the reducing operation of adaptive power consumption can be performed in a standby mode. As described hereinbefore, the invention can adaptively adjust the period for suitable system synchronization which is necessary for the low power mode required by the digital radio mobile terminal thereby having effects to suitably adjust the system synchronization and optimize the consumed current as well according to the system state.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An adaptive method for reducing power consumption in a standby mode of a digital radio communication terminal, comprising the steps of:
   (A) calculating the difference of edge timings between a main clock and a low frequency clock;
   (B) comparing the calculated timing difference with a predetermined difference reference value;
   (C) upgrading or downgrading a catnap period calculation variable according to a result of step (B);
   (D) comparing the upgraded or downgraded catnap period calculation variable with predetermined maximum and minimum critical values;
   (E) shortening or lengthening the catnap period according to a result of step (D);
   (F) comparing the catnap period calculation variable with the predetermined maximum critical value;
   (G) shortening the catnap period if the catnap period calculation variable is greater than the maximum critical value;
   (H) comparing the catnap period calculation variable with the predetermined minimum critical value if the catnap period calculation variable is less than or equal to the maximum critical value; and
   (I) lengthening the catnap period if the catnap period calculation variable is less than the minimum critical variable.

* * * * *